No. 702,589. Patented June 17, 1902.
J. H. RAST.
BICYCLE SEAT POST CLAMP.
(Application filed Nov. 18, 1901.)
(No Model.)
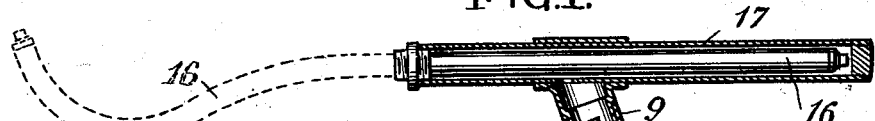
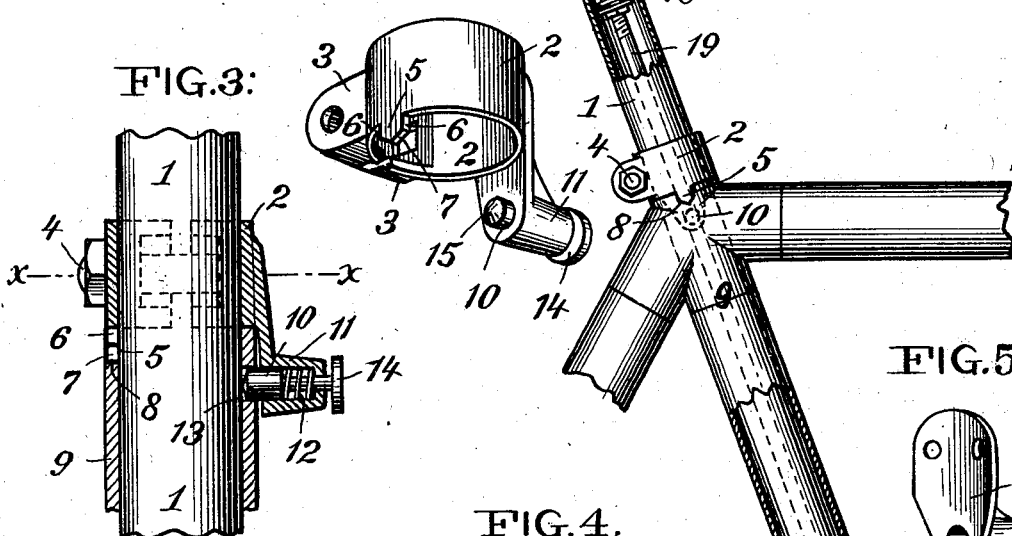
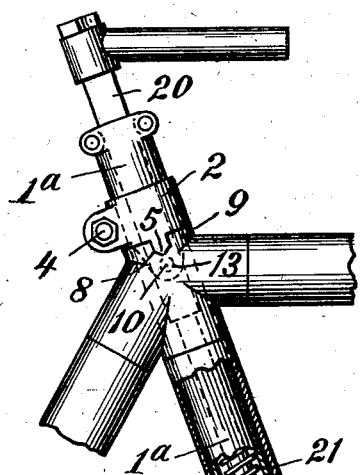
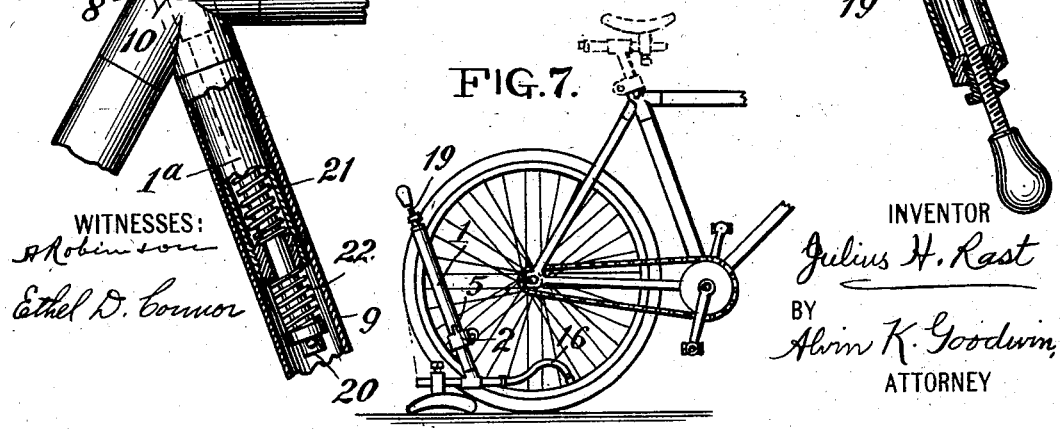
WITNESSES:
A. Robinson
Ethel D. Connor
INVENTOR
Julius H. Rast
BY
Alvin K. Goodwin,
ATTORNEY

UNITED STATES PATENT OFFICE.

JULIUS H. RAST, OF CHARLESTON, SOUTH CAROLINA.

BICYCLE-SEAT-POST CLAMP.

SPECIFICATION forming part of Letters Patent No. 702,589, dated June 17, 1902.

Application filed November 18, 1901. Serial No. 82,745. (No model.)

*To all whom it may concern:*

Be it known that I, JULIUS H. RAST, a citizen of the United States of America, residing at the city of Charleston, in the county of Charleston, State of South Carolina, have invented a new and Improved Bicycle-Seat-Post Clamp, of which the following is a specification.

This invention has for its more special object to provide a simple and efficient clamp adapted to safely sustain the rider's seat or saddle at any desired height on a bicycle-frame, while permitting very quick and convenient removal of the saddle to lessen the danger of the bicycle being stolen, and also to allow inflation of its pneumatic tires when the seat-post is fitted as a pump in accordance with my prior United States Patent, No. 668,214, which shows a seat-post-clamp device, upon which the present invention is an improvement.

The invention will first be described and then will be particularly defined in claims hereinafter set forth.

Reference is made to the accompanying drawings, forming part of this specification, in which—

Figure 1 is a sectional side elevation showing the improved clamp applied to a seat-post fitted as a pump adapted for inflating the bicycle wheel-tires. Fig. 2 is an enlarged bottom perspective view of the clamp removed from the seat-post and bicycle-frame. Fig. 3 is a front detail vertical sectional elevation showing how the improved seat-post clamp locks into opposite sides of the bicycle-frame. Fig. 4 is a detail sectional plan of the clamp, taken on the line *x x* in Fig. 3. Fig. 5 is a perspective view of a preferred latch-bolt socket which I propose to pin and solder to the main collar of the clamp. Fig. 6 is a detail sectional side elevation showing the special adaptation of my improved seat-post clamp for sustaining a quickly-removable spring seat-post at any desired height in a bicycle-frame, and Fig. 7 illustrates the manner of inflating a bicycle-tire by using the pump seat-post of Fig. 1 of the drawings.

The improved seat-post clamp has a suitable collar which may be made in various ways, adapting it to be fastened against vertical movement upon the stem 1 of a bicycle seat-post. I prefer to employ a split collar 2, having opposite ears or lugs 3 3, into which an ordinary clamping-bolt 4 is fitted. At its lower edge and at one side this collar 2 has a pendent lug or lip 5, preferably having two opposite vertical shoulders 6 6, and a tapering or V-shaped point 7. This lug 5 is adapted to fit into a correspondingly-shaped notch 8 made in the top of the saddle-post-supporting tube or portion 9 of a bicycle-frame. At its side opposite the lug 5 the clamp-collar 2 has a hardened-steel bolt or pin 10, fitted into a pendent lug or socket-piece 11 of the clamp-collar 2. I show this bolt 10 reduced at its outer portion to give room around it in the socket for a spiral spring 12, which normally forces the bolt toward or into a latch-hole 13, made in the frame-tube 9 near its upper end and preferably about opposite the frame-notch 8, which receives the collar-lug 5 above mentioned. Any suitable head 14 on the bolt 10 permits quick and easy pulling of it from the frame-hole 13 when it is desired to remove the seat-post and saddle from the bicycle-frame. I purposely taper the inner end of the latch-bolt 10 to give it a central point 15, specially intended to serve as a center punch to indicate the exact location to bore the latch-hole 13 in the frame-tube 9 after the clamp-collar lug 5 is fitted into its frame-notch 8. I now prefer to make the socket-piece 11 separate from the clamp-collar 2 and with a flange adapting it to be first pinned and then brazed to the outside of the collar; but the collar and socket may be formed in one piece, if so desired.

In fitting my improved seat-post clamp to a bicycle, as shown in Figs. 1 and 3 of the drawings, the collar 2 will be bolted upon the seat-post stem 1, and after the notch 8 has been cut or filed in the bicycle-frame tube 9 the stem 1 is slipped into said tube 9, and the bolt 10 will be drawn back to allow the collar-lug 5 to fully enter the frame-notch 8, whereupon the head 14 of the latch-bolt 10 will be struck by a hammer to center-punch the outside of the frame-tube 9 by the point 15 of the latch-bolt. The seat-post now will be withdrawn from the tube 9, which then will be bored at the center-punch mark to make the hole 13 at the exact place to properly receive the latch-bolt. The seat-post stem 1 may now be replaced in the frame-tube 9, and the clamp-collar lug 5 will enter the frame-notch 8, and the bolt 10 will lock into the frame-tube hole 13 and positively prevent undesired upward jumping of the seat-post and saddle while they are positively locked against turning sidewise or laterally on the frame by the collar-lug 5. The shoulders 6 6 of this lug are specially provided to fully relieve the latch-bolt 10 and its frame-hole 13 of all lateral strains, while more certainly preventing lateral swinging or turning movement of the rider's saddle on the bicycle-frame. To remove the seat-post and saddle from the bicycle-frame, it only is necessary to draw the latch-bolt 10 from the frame-hole 13 and then pull upward on the seat-post or saddle to withdraw the post-stem 1 from the frame-tube 9. When the saddle and seat-post are thus removed, they may be inverted, so that the saddle may be rested on the ground, and the flexible air-tube 16, usually carried in the seat-post head 17, may be withdrawn therefrom and may be externally coupled thereto and be coupled also to a valve of the bicycle wheel-tire, as shown in Fig. 7 of the drawings. The tire may now be easily and fully inflated by working the pump-piston 18 in the seat-post stem 1 by means of its rod 19, as more fully described in my prior patent, No. 668,214.

A specially-good feature of my invention is the facility it gives for fitting a spring seat-post into the frame of a bicycle originally having an ordinary rigid seat-post fastened by an internal expander. This is illustrated in Fig. 6 of the drawings, which shows that in this case it is only necessary to remove the old rigid seat-post, with its expander, from the bicycle-frame tube 9 and then clamp my improved collar 2 directly to the outside of the barrel or tube 1ᵃ in which is guided the vertically-yielding rod portion 20 of the seat-post. This rod is sustained in usual manner by springs 21 22 to allow it and the saddle it carries to elastically yield under the weight of the rider. This frame-tube 9 is of course to be notched at 8 to receive the collar-lug 5 and is also oppositely bored at 13 to receive the latch-bolt 10 of the clamp-collar, substantially as hereinbefore described.

My improved seat-post clamp is evidently adapted for use on the stem of a plain seat-post as well as on one fitted as a tire-inflating pump and on a spring-supported seat-post and saddle. In every case the seat-post and saddle may be almost instantly adjusted at any desired height on the bicycle-frame by vertically changing the position of the clamp-collar 2 on the seat-post stem. In every case also the seat-post and saddle may be almost instantly removed from the bicycle-frame by first withdrawing the latch-bolt 10 from the frame-tube 9 and then simply lifting the seat-post from the bicycle-frame.

I am not limited to the use of a spring-pressed bolt 10 as a means for laterally center-marking the bicycle-frame and later engaging the bore made at said mark to prevent accidental detachment of the seat-post to which the clamp-collar is fastened, as I may use any other device having a conical or other suitable end which may by its lateral movement first mark the bicycle-frame and later enter the hole or bore made at said mark for vertically locking the seat-post to the bicycle-frame.

In the most complete form of the invention shown in the drawings the clamp-collar device has means, such as the lug 5, which interlocks with the bicycle-frame to prevent lateral or sidewise turning of the saddle on the frame and also has a laterally-movable part, such as the bolt 10, which is first a frame-marker and later enters the hole or bore made at said mark to prevent accidental vertical detachment of the seat-post from the bicycle-frame.

I claim as my invention—

1. A bicycle-seat-post clamp adapted for fastening at variable heights to the seat-post stem and having a laterally-movable part adapted to mark the bicycle-frame for precisely indicating the place of boring said frame to later receive said laterally-movable part for preventing accidental detachment of the seat-post from the bicycle-frame, substantially as described.

2. A bicycle-seat-post clamp adapted for fastening at variable heights to the seat-post stem and comprising a collar having a part adapted to interlock laterally with the bicycle-frame to prevent sidewise turning of the seat-post and saddle on the frame and also having a laterally-movable part adapted to mark the bicycle-frame for precisely indicating the place of boring said frame to later receive said laterally-movable part for preventing accidental detachment of the seat-post and saddle from the bicycle-frame, substantially as described.

3. The combination, with a bicycle-frame having a notch 8 and an oppositely-arranged hole 13, and a seat-post having a stem or spring-barrel entering the frame, of a collar 2, vertically adjustable on the seat-post or barrel and having a lug 5 adapted to the frame-notch 8 and also having a latch-bolt 10 and a spring 12 normally forcing said bolt into the frame-hole 13 when the collar-lug 5 is engaged with the frame-notch 8; said bolt being adapted when the lug 5 is first entered into the frame-notch 8 to mark the frame to precisely indicate the place for boring the hole 13 which later receives it, substantially as described.

JULIUS H. RAST.

Witnesses:
HENRY M. QUALE,
RUDOLPH C. VOIGT.